United States Patent [19]

Pasternak

[11] Patent Number: 5,240,591
[45] Date of Patent: Aug. 31, 1993

[54] MEMBRANE PROCESS FOR SEPARATING A MIXTURE CONTAINING DEWAXED OIL AND DEWAXING SOLVENT

[75] Inventor: Mordechai Pasternak, Spring Valley, N.Y.

[73] Assignee: Texaco Inc., White Plains, N.Y.

[21] Appl. No.: 754,103

[22] Filed: Sep. 3, 1991

[51] Int. Cl.$^5$ .................. B01D 71/26; B01D 61/00
[52] U.S. Cl. ........................... 208/308; 208/33; 210/500.36; 210/654; 585/819
[58] Field of Search ............ 208/33, 308; 585/819; 210/500.36, 651, 654

[56] References Cited

U.S. PATENT DOCUMENTS

| | | | |
|---|---|---|---|
| 3,758,605 | 9/1973 | Hughes et al. | 208/308 |
| 3,865,890 | 2/1975 | Steigelmann et al. | 208/308 |
| 4,617,126 | 10/1986 | Funk et al. | 210/500.41 |
| 4,678,555 | 7/1987 | Wernick | 208/36 |
| 4,836,927 | 6/1989 | Wan | 210/651 |
| 4,985,138 | 1/1991 | Pasternak | 208/308 |

Primary Examiner—Theodore Morris
Assistant Examiner—P. L. Hailey
Attorney, Agent, or Firm—James J. O'Loughlin; Carl G. Seutter

[57] ABSTRACT

A charge containing dewaxed oil/dewaxing solvent may be treated to effect separation of components by a thermally cross-linked hydrocarbon-derived elastomer membrane, typified by polybutadiene.

8 Claims, No Drawings

MEMBRANE PROCESS FOR SEPARATING A MIXTURE CONTAINING DEWAXED OIL AND DEWAXING SOLVENT

FIELD OF THE INVENTION

This invention relates to a process for treating a charge containing dewaxing solvent and dewaxed oil. More particularly it relates to use of membrane technology to separate dewaxing solvent from dewaxed oil.

BACKGROUND OF THE INVENTION

As is well known to those skilled in the art, hydrocarbon stocks used for the preparation of lubricating oil contain undesirable components which are removed during processing to permit attainment of a product which is characterized by desired properties. Typically a charge stock is subjected inter alia to a dewaxing operation which decreases the wax content and desirably lowers the pour point and the cloud point of the lubricating oil stock.

Dewaxing may be effected by mixing a dewaxing solvent, such as methyl ethyl ketone or methyl isobutyl ketone, optionally in the presence of a hydrocarbon such as toluene or xylene, with the charge oil and cooling the mixture below the desired pour point, typically to minus 5° F.-minus 20° F., say minus 10° F., at which point wax precipitates. The wax is filtered; and the dewaxed oil - dewaxing solvent mixture is recovered.

This recovered mixture has classically been flashed to recover solvent-free lubricating oil stock and solvent which is free of lubricating oil.

Those skilled in the art have attempted to improve the economics of this process by utilizing membrane technology to separate dewaxing solvent from dewaxed oil. Illustrative of such prior art attempts may be the following:

U.S. Pat. No. 4,985,138 to Pasternak discloses a cross-linked polyimine membrane.

European Patent Specification 0 220 753 A1 to Bitter et al discloses use of a halogen-substituted silicone membrane.

U.S. Pat. No. 4,678,555 to Wernick discloses use of cellulose acetate membranes.

European Patent Specification 0 125 907 A1 to Wight discloses use of a polyimide membrane containing —CO—N0—linkages.

U.S. Pat. No. 4,617,126 to Funk et al discloses use of a polysulfone membrane.

Additional background may be obtained from the references set forth in these patents.

It is an object of this invention to provide a process for treating a charge containing dewaxing solvent and dewaxed oil. Other objects will be apparent to those skilled in the art.

STATEMENT OF THE INVENTION

In accordance with certain of the aspects, this invention is directed to a process for treating a charge containing dewaxing solvent and dewaxed oil which comprises passing said charge containing dewaxing solvent and dewaxed oil into contact with, as separating membrane, a non-porous elastomer separating membrane layer of a non-crystalline, carbon-carbon backbone polymer of molecular weight $\overline{M}_n$ of about 1000-100,000;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate through said membrane thereby maintaining said charge containing dewaxing solvent and dewaxed oil and said retentate in liquid phase;

recovering said permeate containing increased content of dewaxing solvent and decreased content of dewaxed oil; and recovering said retentate containing increased content of dewaxed oil and decreased content of dewaxing solvent.

DESCRIPTION OF THE INVENTION

The lube oil stocks which may be treated by dewaxing may include distillate stocks, deasphalted oils, raffinates from solvent extraction of distillate, hydrotreated oils, hydrocracked distillates, etc. typically ranging in viscosity at 100° F. from about 30 SUS to 4000 SUS. Typically such a charge may be characterized by the following:

TABLE

| Property | Range | Preferred | Typical |
|---|---|---|---|
| ibp °F. | 590-900 | 600-800 | 675 |
| 50% bp °F. | 725-1100 | 800-900 | 850 |
| 90% bp °F. | 800-1350 | 850-950 | 920 |
| Viscosity | | | |
| SUS/100 °F. | 35-3500 | 40-100 | 54.63 |
| 60 °F. | 50-10,000 | 100-400 | 348.7 |
| API Gravity | 20-30 | 22-29 | 25.8 |
| Sp. Gr 15° C./15° C. | 0.870-0.895 | 0.880-0.890 | 0.890 |
| Pour Point °F. | 90-125 | 95-110 | 95+ |
| Flash Point °F. | 360-600 | 385-560 | 460 |
| Refractive Index @ 70° C. | 1.4720-1.4940 | 1.4755-1.4920 | 1.4840 |

This waxy oil charge (100 volumes) is mixed with 100-1000 volumes, preferably 200-500 volumes, say 200 volumes (depending on the viscosity grade and wax content of the feedstock) of ketone dewaxing solvent—such as acetone or preferably methyl ethyl ketone or methyl isobutyl ketone preferably diluted with a hydrocarbon solvent to produce dewaxing solvent. In a preferred embodiment, there may be added to 100 volumes of waxy oil charge, dewaxing solvent containing 100-150 volumes of ketone such as methyl ethyl ketone plus 100-500 volumes of a hydrocarbon solvent such as toluene or xylene. The mixture is cooled to minus 5° F.-minus 20° F., say minus 10° F., during which cooling, solid wax precipitates from the waxy oil charge. Typically a mid-continent distillate may be cooled to minus 10° F. to obtain a 0° F. pour point 100 neutral oil. Wax is filtered in a rotary vacuum filter to yield a dewaxed oil filtrate.

In accordance with practice of the process of this invention, this filtrate, containing dewaxing solvent and dewaxed oil, is passed into contact with a membrane assembly including, as a separation membrane, a non-porous separating elastomer membrane layer.

THE MEMBRANE ASSEMBLY

Practice of the process of this invention may be carried out by use of a composite structure which in one preferred embodiment may include (i) a carrier layer which provides mechanical strength; (ii) a porous support layer, and (iii) a separating elastomer membrane layer across which separation occurs.

The composite structure of this invention includes a multi-layer assembly which in the preferred embodiment preferably includes a porous carrier layer which provides mechanical strength and support to the assembly.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, woven fibrous polyester. A typical polyester carrier layer may be formulated of non-woven, thermally-bonded strands.

THE POROUS SUPPORT LAYER

The porous support layer (typically an ultrafiltration membrane) which may be used in practice of this invention is preferably formed of polyacrylonitrile polymer. Typically the polyacrylonitrile may be of thickness of 40–80 microns, say 50 microns and is preferably characterized by a pore size of less than about 500 Å and typically about 200 Å. This corresponds to a molecular weight cut-off of less than about 80,000, typically 40,000.

THE SEPARATING LAYER

The separating layer which permits attainment of separation in accordance with the process of this invention includes a non-porous film or membrane of thickness of 1–5 microns, say about 1.5 microns of non-crystalline carbon-carbon backbone elastomer polymer. The molecular weight $\overline{M}_n$ of the elastomer may vary depending on the particular elastomer—but generally it will be about 1000–100,000, preferably 1000–5000, say about 2800.

The hydrocarbon-derived elastomers may be homopolymers or copolymers of hydrocarbon monomers containing at least one ethylenically unsaturated double bond.

Illustrative of the elastomers which may be employed may be noted the following:

(i) mono-olefin elastomers typified by homopolymers of ethylene, propylene, isobutylene, butylene;

(ii) elastomers of dienes such as butadienes, containing the linkage —C=C—C=C— including 1,3-butadine se; 1,3-pentadiene; 2-methyl-1,3-butadiene-; 1,4-hexadiene, etc;

(iii) elastomers of copolymers of butadiene with other monomers such as isobutylene or isoprene;

(iv) elastomers of copolymer of ethylene and a lower (i.e. $C_3$–$C_{10}$) alkene typified by copolymers of ethylene-propylene (commonly designated as EPR);

(v) elastomers of terpolymers of ethylenepropylene-third monomer (commonly referred to as EPT or EPDM) such as the terpolymers of ethylene-propylene with 1,4-hexadiene or ethylidene -2-norbornene or dicyclopentadiene.

Illustrative commercially available compositions which may be employed include the following:

A. Vistalon 606 brand (of Exxon Chemical Co.) of EPR - copolymer of ethylene-propylene;

B. Vistalon 2504 brand (of Exxon Chemical Co.) of EPDM - terpolymer of ethylene-propylene-ediene third monomer.

C. Vistanex $\overline{M}_n$ L-120 brand (of Exxon Chemical Co.) of polyisobutylene;

d. Exxon Butyl 077 brand (of Exxon Chemical Co.) of intermediate weight isobutylene-based polymer containing less than 3 mole % isoprene in the polymer molecule.

Formation of the elastomer membrane may be carried out from a solution, in inert diluent-solvent (typified by a hydrocarbon such as commercial hexane) containing 5–15%, say 10 w % of e.g. polybutadiene of $\overline{M}_n$ of 2800.

This solution may be solvent cast as a 0.5–4 mil, say 2 mil film onto a support layer (on a carrier layer) typically at 20° C.–30° C., say 25° C. Thereafter it is heat cured at 125° C.–170° C., say 150° C. for 10–20 minutes, say 15 minutes to form a film 1–5, say 1.5 microns thick. Alternatively curing i.e. cross-linking may be effected by use of chemical agents, as radical initiators, typified by benzoyl peroxide, hydrogen peroxide, acetyl peroxide, azobis isobutyronitrile, etc. The heat-cured membranes of this invention are found to have higher Selectivity and generally higher Flux than similar membranes which have been cured with chemical agents.

THE COMPOSITE MEMBRANE

It is a feature of this invention that it may utilize a composite membrane which comprises (i) a carrier layer characterized by mechanical strength, for supporting a porous support layer and a separating layer (ii) a porous support layer such as a polyacrylonitrile membrane of 10–80 microns, and of molecular weight cut-off of 25,000–100,000, and (iii) as a non-porous separating layer in elastomer membrane.

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There is then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit prevents fluid from bypassing the operative membrane system and insures that fluid enters the system principally at one end. The permeate passes from the feed channel, into contact with the separating layer and thence therethrough, into the permeate channel and thence therethrough to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid which permeates the membrane passes into the volume occupied by the permeate spacer and through this permeate channel to the perforations in the cylindrical conduit through which it is withdrawn from the system.

In another embodiment, it is possible to utilize the system of this invention as a tubular or hollow fibre. In this embodiment, the polyacrylonitrile porous support layer may be extruded as a fine tube with a wall thickness of typically 0.001–0.1 mm. The extruded tubes are passed through a bath of elastomer which is cross-linked and cured in situ. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

PRESSURE DRIVEN PROCESS

It is a feature of the non-porous cross-linked elastomer separating layer that it is found to be particularly effective when used in a pressure driven process. In a pressure driven process, a charge liquid containing a more permeable and a less permeable component is maintained in contact with a non-porous separating layer; and a pressure drop is maintained across that layer. A portion of the charge liquid dissolves into the membrane and diffuses therethrough. The permeate passes through the membrane and exits as a liquid.

In practice of the process of this invention, the charge containing dewaxing solvent and dewaxed oil in liquid phase typically at 20° C.–40° C., say 25° C. may be passed into contact with the non-porous elastomer separating layer of the membrane of this invention. A pressure drop of about 500–1000 psi, say 800 psi is commonly maintained across the membrane. The feed or charge side of the membrane is at pressure sufficient to drive permeate across the membrane and commonly about 800 psig; and the permeate or discharge side of the membrane is at about atmospheric pressure. The feed is passed over the surface (ca three inches in diameter in one embodiment) of the membrane at a rate (e.g. of about 1200 ml/min) which minimizes the possibility of concentration polarization.

The permeate which passes through the membrane includes increased content of dewaxing solvent and decreased content of dewaxed oil; and the retentate includes increased content of dewaxed oil and decreased content of dewaxing solvent.

Typically when the charge to the membrane contains (per 100 parts of oil) 100–1100, preferably 200–600 parts, say 200 parts of dewaxing solvent, the permeate may be found to contain about 94 w % of dewaxing solvent.

Permeate is recovered in liquid phase.

Separation may typically be carried out at a flux of 20–40, say 36.2 kilograms per square meter per hour (kmh). Typically the membranes may have a rejection of 55%–85%, say 82.7%.

$$\text{Rejection \%} = \frac{(\text{Feed Concentration} - \text{Permeate Concentration}) \times 100}{\text{Feed Concentration}}$$

Practice of the process of this invention will be apparent to those skilled in the art from the following examples wherein, as elsewhere in this specification, all percentages are percentages by weight unless otherwise stated.

DESCRIPTION OF SPECIFIC EMBODIMENTS

EXAMPLE I

In this Example, which represents the best mode of carrying out the process of this invention, the elastomer separating membrane is formed on the DUY-L support (of Daicel Corp.) which includes as carrier layer the woven polyester backing described supra. The porous support layer is the commercially available polyacrylonitrile (PAN) having a 40,000 molecular weight cut off.

A solution of elastomer in commercial hexane containing 10 w % of poly(1,3-butadiene) $\overline{M}_n$ 2800 is poured onto the porous support layer at 25° C. to coat a film of about 2 mil thickness, followed by heat curing at 150° C. for 15 minutes to yield a separating layer 1.5 microns thick.

This membrane (three inch diameter circle) is mounted in a standard cell. There is admitted to the cell and to the non-porous elastomer separating layer a charge containing 100 parts by weight of dewaxed SNO-100 oil and 100 parts by weight of methyl ethyl ketone and 100 parts by weight of toluene.

Separation is carried out at room temperature of 25° C. and a charge (and retentate) pressure of about 800 psig. Feed is at 25° C./800 psig at flow rate of 1200 ml/min. Permeate pressure is atmospheric. Selectivity is measured and reported as % Rejection which is calculated at 100 x (the quantity of dewaxed oil in the feed minus the quantity of dewaxed oil in the permeate) divided by the quantity of dewaxed oil in the feed. Clearly a higher Selectivity is desired, as this means that the retentate desirably contains less dewaxing solvent and the permeate desirably contains more solvent. Flux is measured as kilograms per square meter per hour (kmh).

In this Example, the Selectivity is 82.7% rejection; Flux is 21.0 kmh.

EXAMPLES II–III

In these Examples, the procedure of Example I is duplicated except that the Membrane Curing Temperature is varied:

| Example | Curing Temp °C. | Performance | |
|---|---|---|---|
| | | Selectivity % Rejection | Flux kmh |
| I | 150 | 82.7 | 21.0 |
| II | 125 | 61.7 | 36.2 |
| III | 170 | 78.2 | 2.5 |

From the above Table, it is apparent that as the temperature of curing increases from 125° C. to 170° C., the Selectivity increases, peaking at 150° C., and then decreases.

The Flux appears to decrease with increasing curing temperature. Although maximum Flux is attained at curing temperature of 125° C., it appears that a curing temperature of 150° C. gives maximum Selectivity with reasonable Flux. Clearly the balance between these two variables will permit one to determine which specific curing temperature is preferred for a particular embodiment. All these membranes showed stable performance over 10 days.

EXAMPLES IV-V

In this series of Examples, the general procedure of Example I is carried out. In Examples IV and V, the hexane solution contained 8 w % poly 1,3-butadiene $\overline{M}_n$ of 2800 and 2 w % benzoyl peroxide radical initiator. The films of Examples II-IV were cured at 125° C.; and the films of Examples I-and V were cured at 150° C.

TABLE

| Example | Radical Initiator | Curing Temp °C. | Performance Selectivity % Rejection | Flux kmh |
|---|---|---|---|---|
| II | None | 125 | 61.7 | 36.2 |
| IV | benzoyl peroxide | 125 | 58.7 | 33.3 |
| I | None | 150 | 82.7 | 21.0 |
| V | benzoyl peroxide | 150 | 78.9 | 22.5 |

From the above Table, the following conclusions may be drawn:

(i) Curing at 150° C. gives better Selectivity than curing at 125° C.;

(ii) Curing at 125° C. gives better Flux than is attained by curing at 150° C.;

(iii) Use of heat curing, without a radical initiator gives better Selectivity;

(iv) At 125° C., better Flux is attained by use of membranes which are heat cured without use of a radical initiator;

(v) At 150° C., slightly better Flux is attained by use of heat curing in the presence of a radical initiator - although the difference may not be significant.

(vi) Satisfactory results are attained over the entire spectrum.

It appears that the most favorable operating conditions include curing at 150° C. without use of the benzoyl peroxide radical initiator.

Results comparable to those of Example I may be attained if the elastomer membrane is:

TABLE

| Example | Elastomer Membrane |
|---|---|
| VI | polyisobutylene |
| VII | polypropylene |
| VIII | polyisoprene |
| IX | copolymer of ethylene-propylene |
| X | terpolymer of ethylene-propylene-ethylidene norbornene |

Results comparable to those of Example I may be attained if the radical initiator is:

TABLE

| Example | Radical Initiator |
|---|---|
| XI | benzoyl peroxide |
| XII | hydrogen peroxide |
| XIII | acetyl peroxide |
| XIV | azobis isobutyronitrile |

Although this invention has been illustrated by reference to specific embodiments, it will be apparent to those skilled in the art that various charges and modifications may be made which clearly fall within the scope of the invention.

What is claimed:

1. The process for treating a charge containing dewaxing solvent and dewaxed oil which comprises
   passing said charge containing dewaxing solvent and dewaxed oil into contact with, as separating membrane, a non-porous elastomer separating membrane layer of a non crystalline, carbon-carbon backbone polymer of molecular weight $\overline{M}_n$ of 1000-100,000;
   maintaining the pressure on the low pressure discharge side of said membrane above the vapor pressure of said permeate thereby maintaining said permeate in liquid phase;
   maintaining the pressure on the high pressure retentate side of said membrane above the vapor pressure of said charge containing dewaxing solvent and dewaxed oil and sufficient to drive permeate through said membrane thereby maintaining said charge containing dewaxing solvent and dewaxed oil and said retentate in liquid phase;
   recovering said permeate containing increased content of dewaxing solvent and decreased content of dewaxed oil; and
   recovering said retentate containing increased content of dewaxed oil and decreased content of dewaxing solvent.

2. The process for treating a charge containing dewaxing solvent and dewaxed oil as claimed in claim 1 wherein said separating membrane is a polymer of a butadiene of molecular weight $\overline{M}_n$ of 1000-100,000.

3. The process for treating a charge containing dewaxing solvent and dewaxed oil as claimed in claim 1 wherein said separating membrane is a polymer of 1,3-butadiene of molecular weight $\overline{M}_n$ of about 2800.

4. The process for treating a charge containing dewaxing solvent and dewaxed oil as claimed in claim 1 wherein said separating membrane has been thermally cross-linked.

5. The process for treating a charge containing dewaxing solvent and dewaxed oil as claimed in claim 1 wherein said separating membrane has been thermally cross-linked at 125°-170° C.

6. The process for treating a charge containing dewaxing solvent and dewaxed oil as claimed in claim 1 wherein said separating membrane is thermally and chemically cross-linked with a radical initiator.

7. The process for treating a charge containing dewaxing solvent and dewaxed oil as claimed in claim 1 wherein said separating membrane is selected from the group consisting of homopolymer and copolymer elastomers of mono-olefins and dienes.

8. The process for treating a charge containing dewaxing solvent and dewaxed oil which comprises
   passing said charge containing dewaxing solvent and dewaxed oil into contact with, as separating membrane, a non-porous elastomer separating membrane layer of a non crystalline, carbon-carbon backbone polymer of 1,3-butadiene of molecular weight $\overline{M}_n$ of about 2800;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;

recovering said permeate containing increased content of dewaxing solvent and decreased content of dewaxed oil; and recovering said retentate containing increased content of dewaxed oil and decreased content of dewaxing solvent.

* * * * *